United States Patent
Chuang et al.

(10) Patent No.: US 10,856,009 B2
(45) Date of Patent: Dec. 1, 2020

(54) METHOD OF BLOCK VECTOR CLIPPING AND CODING FOR SCREEN CONTENT CODING AND VIDEO CODING

(71) Applicant: MEDIATEK INC., Hsinchu (TW)

(72) Inventors: Tzu-Der Chuang, Zhubei (TW); Xiaozhong Xu, Fremont, CA (US); Yu-Chen Sun, Keelung (TW); Shih-Ta Hsiang, New Taipei (TW); Shan Liu, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 133 days.

(21) Appl. No.: 15/514,926

(22) PCT Filed: Oct. 8, 2015

(86) PCT No.: PCT/CN2015/091466
§ 371 (c)(1),
(2) Date: Mar. 28, 2017

(87) PCT Pub. No.: WO2016/055001
PCT Pub. Date: Apr. 14, 2016

(65) Prior Publication Data
US 2017/0223379 A1    Aug. 3, 2017

Related U.S. Application Data

(60) Provisional application No. 62/067,534, filed on Oct. 23, 2014, provisional application No. 62/063,496, (Continued)

(51) Int. Cl.
*H04N 19/593* (2014.01)
*H04N 19/513* (2014.01)
*H04N 19/52* (2014.01)

(52) U.S. Cl.
CPC ......... *H04N 19/593* (2014.11); *H04N 19/513* (2014.11); *H04N 19/52* (2014.11)

(58) Field of Classification Search
CPC .... H04N 19/593; H04N 19/513; H04N 19/52; H04N 19/53; H04N 19/00684; H04N 19/00733
See application file for complete search history.

(56) References Cited

U.S. PATENT DOCUMENTS 10,390,034 B2 * 8/2019 Zhu .................. H04N 19/593
2013/0163668 A1  6/2013 Chen et al.
(Continued)

FOREIGN PATENT DOCUMENTS

CN    102595118 A    7/2012
CN    103168472 A    6/2013
(Continued)

OTHER PUBLICATIONS

Chao Pang et al., "AhG5: Intra Block Copying with Padding" Doc. JCTVC-O_0157, Geneva, CH Oct. 23-Nov. 1, 2013 (Year: 2013).*
(Continued)

*Primary Examiner* — Dramos Kalapodas
(74) *Attorney, Agent, or Firm* — Oblon, McClelland, Maier & Neustadt, L.L.P.

(57) ABSTRACT

A method of video coding using coding modes including IntraBC mode (Intra-block copy mode) for a picture is disclosed. The system determines whether the current reference block is located above a current coding unit (CU) containing the current prediction unit (PU) in a vertical direction and whether the current reference block is located on a left side of the current CU in a horizontal direction based on the original block vector (BV). If both results are not true, the original BV is clipped to a clipped BV so that a relocated reference block corresponding to the clipped BV (Continued)

is above the current CU in the vertical direction or to the left side of the current CU in the horizontal direction. The clipped BV is used as a predictor for encoding or decoding of a current BV or used for IntraBC encoding or decoding of the current PU.

14 Claims, 7 Drawing Sheets

Related U.S. Application Data filed on Oct. 14, 2014, provisional application No. 62/061,229, filed on Oct. 8, 2014.

(56) References Cited

U.S. PATENT DOCUMENTS

| | | | |
|---|---|---|---|
| 2013/0301715 A1* | 11/2013 | Lin | H04N 19/593 |
| | | | 375/240.12 |
| 2013/0343447 A1 | 12/2013 | Chen et al. | |
| 2015/0049813 A1* | 2/2015 | Tabatabai | H04N 19/513 |
| | | | 375/240.16 |
| 2015/0063440 A1* | 3/2015 | Pang | H04N 19/174 |
| | | | 375/240.02 |
| 2015/0271502 A1 | 9/2015 | Hattori et al. | |
| 2016/0057430 A1* | 2/2016 | Kolesnikov | H04N 19/176 |
| | | | 375/240.12 |
| 2016/0100163 A1* | 4/2016 | Rapaka | H04N 19/117 |
| | | | 375/240.16 |
| 2016/0227244 A1* | 8/2016 | Rosewarne | H04N 19/463 |
| 2016/0241852 A1* | 8/2016 | Gamei | H04N 19/50 |
| 2016/0309168 A1 | 10/2016 | Oh et al. | |
| 2017/0302966 A1* | 10/2017 | Xu | H04N 19/196 |

FOREIGN PATENT DOCUMENTS

| | | |
|---|---|---|
| CN | 104012096 A | 8/2014 |
| WO | WO 2014/051081 A1 | 4/2014 |

OTHER PUBLICATIONS

Pang et al., "Non-RCE3-Intra Motion Compensation With 2-D MVs" JCTVC-N0256; Viena AT, Jul. 25, 2013 (Year: 2013).*
Zhu, L., et al.; "Initialization of block vector predictor for intra block copy;" Joint Collaborative Team on Video Coding (JCT-VC) of ITU-T SG 16 WP 3 and ISO/IEC JTC 1/SC 29/WG 11; Jan. 2014; pp. 1-6.
Rosewarne, C., et al.; "HEVC Range Extensions Test Model 6 Encoder Description;" Joint Collaborative Team on Video Coding (JCT-VC) of ITU-T SG 16 WP 3 and ISO/IEC JTC 1/SC 29/WG 11; Jan. 2014; pp. 1-20.
Lai, P.L., et al.; "Description of screen content coding technology proposal by MediaTek;" Joint Collaborative Team on Video Coding (JCT-VC) of ITU-T SG 16 WP 3 and ISO/IEC JTC 1/SC 29/WG 11; Mar.-Apr. 2014; pp. 1-31.
International Search Report dated Nov. 24, 2015, issued in application No. PCT/CN2015/091466.
Pang, C., et al.; "Non-SCCE1: Combination of JCTVC-R0185 and JCTVC-R0203;" Joint Collaborative Team on Video Coding (JCT-VC) of ITU-T SG 16 WP 3 and ISO/IEC JTC 1/SC 29/WG 11; 18th Meeting' Sapporo, JP; Jun.-Jul. 2014; pp. 1-7.
Pang, C. et al.; "Non-RCE3: Intra Motion Compensation with 2-D MVs;" Joint Collaborative Team on Video Coding (JCT-VC) of ITU-T SG 16 WP 3 and ISO/IEC JTC 1/SC 29/WG 11; 14th Meeting; Vienna, AT; Jul.-Aug. 2013; pp. 1-12.
Flynn, D., et al.; "BoG report on Range Extensions topics;" Joint Collaborative Team on Video Coding (JCT-VC) of ITU-T SG 16 WP 3 and ISO/IEC JTC 1/Sc 29/WG 11; Oct.-Nov. 2013; pp. 1-54.
Li, B., et al.; "On Inbra BC mode;" Joint Collaborative Team on Video Coding (JCT-VC) of ITU-T SG 16 WP 3 and ISO IEC/JTC 1/Sc 29/WG 11; Oct.-Nov. 2013; pp. 1-13.

* cited by examiner

METHOD OF BLOCK VECTOR CLIPPING AND CODING FOR SCREEN CONTENT CODING AND VIDEO CODING

CROSS REFERENCE TO RELATED APPLICATIONS

The present invention claims priority to U.S. Provisional Patent Application, Ser. No. 62/061,229, filed on Oct. 8, 2014, U.S. Provisional Patent Application, Ser. No. 62/063,496, filed on Oct. 14, 2014, and U.S. Provisional Patent Application, Ser. No. 62/067,534, filed on Oct. 23, 2014. The present invention is also related to U.S. Provisional Patent Application, Ser. No. 62/045,620, filed on Sep. 4, 2014. The U.S. Provisional patent applications are hereby incorporated by reference in their entireties.

TECHNICAL FIELD

The present invention relates to video coding including Intra-block copy (IntraBC) mode. In particular, the present invention relates to techniques to handle the cases that some data pointed by a block vector is unavailable or invalid.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, K R, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transforms.

In JCTVC-M0350, the Intra MC is different from the motion compensation used for Inter prediction in at least the following areas:
  MVs are restricted to be 1-D for Intra MC (i.e., either horizontal or vertical) while Inter prediction uses 2-D motion estimation.
  Binarization is fixed length for Intra MC while Inter prediction uses exponential-Golomb.
  Intra MC introduces a new syntax element to signal whether the MV is horizontal or vertical.

Based on JCTVC-M0350, some modifications are disclosed by Pang, et al. in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, A T, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two MV coding methods are disclosed:
  Method 1: Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.
  Method 2: NoMotion vector prediction. The MV is coded using the exponential-Golomb codes that are used for MVD in HEVC.

Another difference disclosed in JCTVC-N0256 is that the 2-D Intra MC is further combined with the pipeline friendly approach:
  1. No interpolation filters are used,
  2. MV search area is restricted. Two cases are disclosed:
    a. Search area is the current CTU and the left CTU or
    b. Search area is the current CTU and the rightmost 4 column samples of the left CTU.

In JCTVC-R0309 (Pang et al., *Non-SCCE1: Combination of JCTVC-R0185 and JCTVC-R0203*, Joint Collaborative Team on Video Coding (JCT-VC) of ITU-T SG 16 WP 3 and ISO/IEC JTC 1/SC 29/WG 11, 18th Meeting: Sapporo, J P, 30 Jun.-9 Jul. 2014, Document: JCTVC-R0309), the BV coding is modified to use the neighboring BVs and coded BVs as BV predictor (BVP). The BVP technique has been adopted in SCM 2.0 (HEVC Screen Content Coding Test Model 2.0). The BV predictor is derived similar to the AMVP (advanced motion vector prediction) scheme in HEVC. The predictor candidate list is constructed by first checking the available of block vector from the spatial neighboring blocks A1 and B1 according to a priority order as shown in FIG. 2. If one or both of the spatial neighboring blocks contain no block vector, one or both of the last two coded BVs are used to fill into the block vector candidate list. The replacement block vectors are initialized with (−2*CU_width, 0) and (−CU_width, 0). To avoid the need of line buffer, the above BV outside the current CTU is considered unavailable. The last two coded BVs are reset to (0, 0) for each CTU to prevent the data dependency.

In HEVC, Merge candidates are derived from spatial/temporal neighboring blocks for the current coded block in Inter coded slice. A merge_flag is used to signal whether the current block is merged into one of its candidates. If yes, another index is used to signal which of the candidates that the current block is merged with. For example, if the second index signaled indicates candidate block a1 in FIG. 2 as the candidate selected, then the current block will share the same motion vector and reference picture as those in block a1. Accordingly, there is no need to signal the motion vector and reference picture explicitly for the current block.

When one or more Merge candidates are not available (e.g. non-existing or non-Inter coded), additional candidates are inserted. If the Merge candidate list is still not full after inserting the additional candidates, zero motion vector with refIdx equal to 0 will be used to fill all the empty candidates.

Two types of additional candidates can be inserted as shown below.
  1. Combined bi-predictive Merge candidate (candidate type 1)
  2. Zero vector Merge/AMVP candidate (candidate type 2)

The type-2 additional candidates are inserted after the type-1 additional candidates.

For candidate type 1, combined bi-predictive Merge candidates are created by combining original Merge candidate. In particular, two candidates in original candidates, are used to create bi-predictive Merge candidates, where one candidate has a motion vector in list 0 (i.e., mvL0) with a reference picture index in list 0 (i.e., refIdxL0) and another candidate has a motion vector in list 1 (i.e., mvL1) and a reference picture index in list 1 (i.e., refIdxL1).

For candidate type 2, zero vector Merge/AMVP candidates are created by combining zero vectors and reference index which can be referred. If zero vector candidates are not duplicated, it is added to Merge/AMVP candidate list.

In SCM-2.0 (screen content coding test model version 2) disclosed in JCTVC-R1014 (Joshi, et al., *Screen content coding test model 2 (SCM 2)*, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1014), coding of block vector difference is modified according to the method disclosed in JCTVC-R0186 (Pang et al., SCCE1: *Test 3.6—Block vector coding for Intra block copy*, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R0186). Furthermore, according to JCTVC-R0186, coding of block vector difference uses one context-coded bin for coding each vector component.

Palette Coding.

In screen content coding, palette is utilized to represent a given video block (e.g. CU). The encoding process is as disclosed by Guo et al., in JCTVC-O0218 (*Evaluation of Palette Mode Coding on HM-12.0+RExt-4.1*, 15th Meeting: Geneva, CH, 23 Oct.-1 Nov. 2013, Document: JCTVC-O0218) as follows:
  1. Transmission of the palette: the palette size is first transmitted followed by the palette elements.
  2. Transmission of pixel values: the pixels in the CU are encoded in a raster scan order. For each position, a flag is first transmitted to indicate whether the "run mode" or "copy above mode" is being used.
    2.1 "Run mode": In "run mode", a palette index is first signaled followed by "palette_run" (e.g., M). No further information needs to be transmitted for the current position and the following M positions as they have the same palette index as signaled. The palette index (e.g., i) is shared by all three color components, which means that the reconstructed pixel values are (Y, U, V)=(palette$_Y$[i], palette$_U$[i], palette$_V$[i]) (assuming the color space is YUV)
    2.2 "Copy above mode": In "copy above mode", a value "copy_run" (e.g., N) is transmitted to indicate that for the following N positions (including the current one), the palette index is equal to the palette index of the one that is at the same location in the row above.
  3. Transmission of residue: the palette indices transmitted in Stage 2 are converted back to pixel values and used as the prediction. Residue information is transmitted using HEVC residue coding and is added to the prediction for the reconstruction.

In JCTVC-N0247 (Guo, et al., RCE3: Results of Test 3.1 on Palette Mode for Screen Content Coding, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0247), palette of each component are constructed and transmitted. The palette can be predicted (shared) from its left neighboring CU to reduce the bitrate. Later on Qualcomm proposed a second version of their palette coding technique [1], in which each element in the palette is a triplet, representing a specific combination of the three color components. The predictive coding of palette across CU is removed. This invention proposes the usage of palette prediction/sharing that can also be applied to the triplet palette format. Again both the palette from the left and/or above CU are utilized, as long as the above CU is within the same CTB (LCU) as the current CU being encoded (reducing line buffer).

Major-Color-Based (or Palette) Coding.

Palette coding is another tool for screen content coding, where palette of each color component is constructed and transmitted. However, the palette can be predicted from the palette of the left CU. For palette prediction, individual entries in a palette can be predicted from the corresponding palette entries in the above CU or left CU.

Upon the construction of the palette, pixel values in a current block are mapped into color indices according to the palette and the color indices are then coded using a predictive coding method as described in JCTVC-O0182 (Guo et al., *AHG8: Major-color-based screen content coding*, Joint Collaborative Team on Video Coding (JCT-VC) of ITU-T SG 16 WP 3 and ISO/15th Meeting: Geneva, CH, 23 Oct.-1 Nov. 2013, Document: JCTVC-O0182). According to JCTVC-O0182, a pixel line can be predicted by different modes. In specific, three kinds of line modes, i.e. horizontal mode, vertical mode and normal mode are used for a pixel line. In horizontal mode, all the pixels in the same line have the same value. If the value is the same as the first pixel of the above pixel line, only line mode signaling bits are transmitted. Otherwise, the index value is also transmitted. In vertical mode, the current pixel line is the same with the above pixel line. Therefore, only line mode signaling bits are transmitted. In normal mode, pixels in a line are predicted individually. For each pixel, the left or above neighbors is used as predictor, and the prediction symbol is transmitted to the decoder.

Furthermore, pixels are classified into major color pixels and escape pixel according to JCTVC-O0182. For major color pixels, the decoder reconstructs pixel value by the major color index (i.e., palette index) and the palette. For escape pixel, the encoder has to further send the pixel value.

For IntraBC coding, some reference pixels of the reference block may not be available. For example, when block vector prediction is used, the decoded block vector for a current block may point to a reference block that overlaps with an image area that is not yet reconstructed. Therefore, it is desirable to develop techniques to solve the issue of unavailable reference data.

SUMMARY

A method of video coding using coding modes including IntraBC mode (Intra-block copy mode) for a picture is disclosed. In one embodiment, an original block vector pointing from a current prediction unit to a current reference block in a current picture is received. Whether the current reference block is located above a current coding unit containing the current prediction unit in a vertical direction is determined based on the original block vector. Also, whether the current reference block is located on a left side of the current coding unit in a horizontal direction is determined based on the original block vector. If the current reference block is not located above the current coding unit in the vertical direction and the current reference block is not located on the left side of the current coding unit in the horizontal direction, the original block vector is clipped to a clipped block vector to cause a relocated reference block corresponding to the clipped block vector to be above the current coding unit in the vertical direction or to be on the left side of the current coding unit in the horizontal direction. The clipped block vector can be used as a predictor for encoding or decoding of a current block vector or utilizing the clipped block vector as a Merge candidate or a Skip candidate for encoding or decoding of the current prediction unit.

Determining whether the current reference block is located above the current coding unit in the vertical direction and determining whether the current reference block is located on the left side of the current coding unit in the horizontal direction can be based on parameters comprising the original block vector, block size of the current prediction unit, and horizontal distance and vertical distance between a top-left sample of the current prediction unit and a top-left sample of the current coding unit. Furthermore, the decision regarding whether the current reference block is located above the current coding unit in the vertical direction can be based on a first sum corresponding to a negative sum of a vertical component of the original block vector, block height of the current prediction unit and the vertical distance between the top-left sample of the current prediction unit and the top-left sample of the current coding unit. Similarly, the decision regarding whether the current reference block is located on the left side of the current coding unit in the horizontal direction is based on a second sum corresponding to a negative sum of a horizontal component of the original block vector, block width of the current prediction unit and the horizontal distance between the top-left sample of the current prediction unit and the top-left sample of the current coding unit. The vertical component of the original block vector has a positive value for the original block vector pointing downward, and the current reference block is located above the current coding unit in the vertical direction if the first sum is equal to or greater than zero. The horizontal component of the original block vector has a positive value for the original block vector pointing to a right direction, and the current reference block is located on the left side of the current coding unit in the horizontal direction if the second sum is equal to or greater than zero.

In one example, if the second sum is greater than or equal to the first sum, then the original block vector is clipped to have a horizontal component corresponding to a negative sum of the block width of the current prediction unit and the horizontal distance between the top-left sample of the current prediction unit and the top-left sample of the current coding unit. If the second sum is smaller than the first sum, then the original block vector is clipped to have a vertical component corresponding to a negative sum of the block height of the current prediction unit and the vertical distance between the top-left sample of the current prediction unit and the top-left sample of the current coding unit. In another example, if the second sum is greater than the first sum, then the original block vector is clipped to have a horizontal component corresponding to a negative sum of the block width of the current prediction unit and the horizontal distance between the top-left sample of the current prediction unit and the top-left sample of the current coding unit. if the second sum is smaller than or equal to the first sum, then the original block vector is clipped to have a vertical component corresponding to a negative sum of the block height of the current prediction unit and the vertical distance between the top-left sample of the current prediction unit and the top-left sample of the current coding unit.

The present invention may further include determining whether the current reference block overlaps with a first area located on the left side of the current coding unit in the horizontal direction and below a coding tree unit containing the current coding unit in the vertical direction, if the current reference block is located on the left side of the current coding unit in the horizontal direction. If the current reference block overlaps with the first area, the original block vector is clipped to have a vertical component corresponding to a block height of the coding tree unit subtracts a block height of the current prediction unit and subtracts vertical distance between a top-left sample of the current prediction unit and a top-left sample of the coding tree unit.

The present invention may further include determining whether the current reference block overlaps with a second area located above the current coding unit in the horizontal direction, to a right side of a coding tree unit containing the current coding unit, and below a top boundary of the coding tree unit in the vertical direction if the current reference block is located above the current coding unit in the vertical direction. If the current reference block overlaps with the second area, the original block vector is clipped to have a vertical component corresponding to a negative sum of a block height of the current prediction unit and vertical distance between a top-left sample of the current prediction unit and a top-left sample of the coding tree unit.

The clipped block vector can set to a pre-defined vector. For example, the pre-defined vector can be selected from a group comprising (−W, 0), (−2W, 0), (0, −H), (0, −2H), (−W, −H), and (−2W, −2H), wherein W and H correspond to width and height of the current prediction unit respectively, or width and height of a current coding unit containing the current prediction unit.

Another method of video coding using coding modes including IntraBC mode (Intra-block copy mode) for a picture is disclosed. In one embodiment, an original block vector pointing from a current prediction unit to a current reference block in a current picture is received, wherein the current reference block and a current coding unit containing the current prediction unit are not overlapped. Whether at least one reference pixel in an area of the current reference block is unavailable is determined. If one or more reference pixels in the area of the current reference block are unavailable, the original block vector is clipped to a clipped block vector to cause all pixels in a relocated reference block corresponding to the clipped block vector to be available for Intra-block copy compensation, and the clipped block vector is utilized as a predictor for encoding or decoding of a current block vector or the clipped block vector is utilized for IntraBC encoding or decoding of the current prediction unit.

An alternative method to handle unavailable samples in a reference block for IntraBC coding is also disclosed. According to an embodiment of the present invention, if reference pixels in an area of the reference block are unavailable, reference pixels in the area of the reference block are replaced by replacement pixel data to form a valid reference block. The replacement pixel data for the area of the reference block being unavailable may correspond to available neighboring pixels of the current prediction unit. The replacement pixel data for the area of the reference block being unavailable may also correspond to a predefined value. Furthermore, all pixels of the reference block are replaced by the predefined value. The predefined value may correspond to 128 or (1<<(bit_depth−1)). The data area for storing reconstructed pixels can be initialized to a predefined value before encoding or decoding of the current picture.

BRIEF DESCRIPTION OF DRAWINGS

FIGS. 10A-B illustrate examples of redundant index determination and the color index coding process to take advantage of redundant index.

FIGS. 11A-B illustrate examples of another redundant index determination and the color index coding process to take advantage of redundant index.

DETAILED DESCRIPTION

Figure 1:
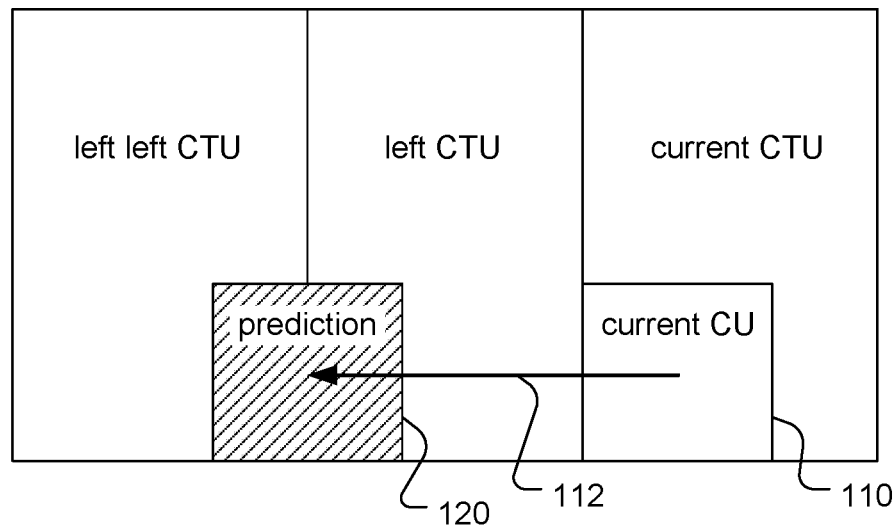
FIG. 1 illustrates an example of Intra motion compensation according to the Intra-block copy (IntraBC) mode, where a horizontal displacement vector is used.
Figure 2:
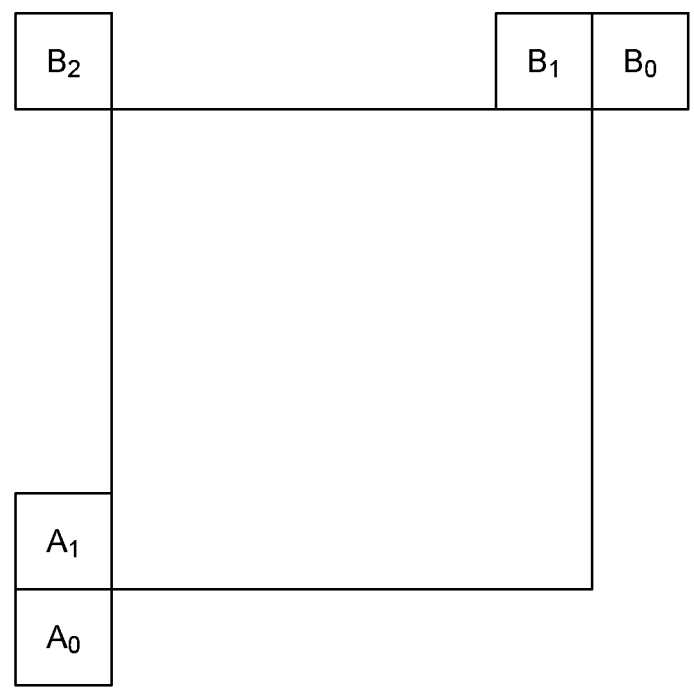
FIG. 2 illustrates an example of neighboring block configuration used to derive motion vector predictor for IntraBC mode.
Figure 3A:
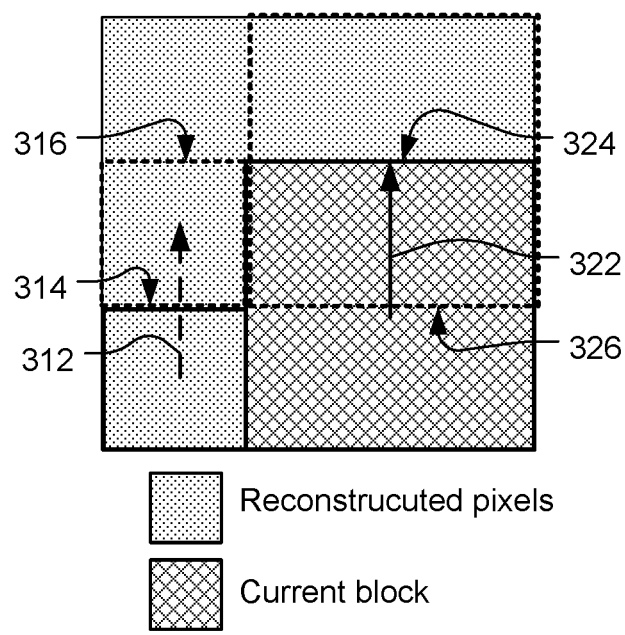
FIGS. 3A-B illustrate examples of invalid block vector predictor.
Figure 3B:
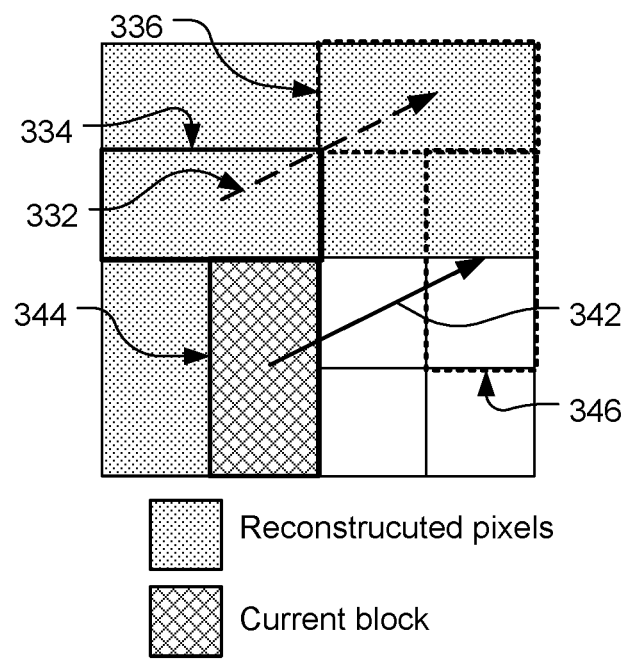

In the existing practice of block vector coding, a block vector (BV) for an IntraBC coded block has some constraints. The BV can only point to some already reconstructed area within the current picture. In the current screen content coding (SCC), the reconstructed area within the same coding unit cannot be used for IntraBC compensation. When a previously coded block vector is used as the predictor (either in normal IntraBC mode or IntraBC merge/skip mode), it sometimes may not be a valid vector for the current block because it does not meet both of the above constraints. FIG. 3A illustrates one example of BVP pointing to an invalid block. In FIG. 3A, the block vector predictor 312 points from previous processed block 314 shown as a solid square to reference block 316 shown as a dashed square. If the current block vector 322 uses block vector 312 as a predictor, the current block 324 shown as a solid square would point to reference area 326 shown as a dashed square. As shown in FIG. 3A, half of the reference block 326 for the current block is in the current block, which is not reconstructed yet (i.e., pixels in the lower half of the reference block 326 are unavailable). FIG. 3B illustrates another example of BVP pointing to an invalid block. In FIG. 3B, the block vector predictor 332 points from previous processed block 334 shown as a solid rectangle to reference block 336 shown as a dashed rectangle. If the current block vector 342 uses block vector 332 as a predictor, the current block 344 shown as a solid rectangle would point to reference area 346 shown as a dashed rectangle. As shown in FIG. 3B, half of the reference block 346 is in the area that is not processed yet (i.e., pixels in the lower half of the reference block 346 are unavailable).

BV Clipping.

In order to overcome the issue of invalid BV, a BV clipping method is disclosed herein. According to one embodiment, a clipping operation is applied to IntraBC block vector (BV) predictor and/or IntraBC Merge candidate. For example, the x-axis component and/or y-axis component of the block vector predictor should meet some requirements. In Table 1, two parameters, Hoffset and Voffset (also referred to as iHoffset and iVoffset) are defined to describe such requirements.

TABLE 1

| Variable Definition | Pseudo code for definition |
| --- | --- |
| PartSize: the partition size of current block.<br>nPSW: current block width<br>nPSH: current block height<br>iPartIdx: partition index of current block<br>CU_size: the width or height of the CU that contains current block | switch ( PartSize )<br>{<br>case SIZE_2N×N:<br>   nPSW = CU_size;<br>   nPSH = CU_size>> 1;<br>   iHoffset = 0;<br>   iVoffset = (iPartIdx ==0)? 0 : nPSH;<br>   break; |

TABLE 1-continued

| Variable Definition | Pseudo code for definition |
|---|---|
| | case SIZE_Nx2N:<br>    nPSW = CU_size>> 1;<br>    nPSH = CU_size;<br>    iHoffset = (iPartIdx ==0)? 0 : nPSW;<br>    iVoffset = 0;<br>        break;<br>case SIZE_NxN:<br>    nPSW = CU_size>> 1;<br>    nPSH = CU_size>> 1;<br>    iHoffset = (iPartIdx&0x1)*nPSW;<br>    iVoffset = (iPartIdx>>1)*nPSH;<br>    break;<br>case SIZE_2Nx2N:<br>    nPSW = CU_size;<br>    nPSH = CU_size;<br>    iHoffset = 0;<br>    iVoffset = 0;<br>    break;<br>} |

Assume the BV predictor for current block is BV=(BV_x, BV_y) and a clipped version of the BV predictor is BV'=(BV_x', BV_y'). The clipping process according to one embodiment of the present invention is described as follows.

Case 1.

If both components of the block vector BV are smaller or equal to 0 before clipping, then when both BV_x>−Hoffset and BV_y>−Voffset are true, a clipping operation is required. For example, BV_x'=−Hoffset and BV_y'=BV_y can be used as the clipped BV. In another example, BV_y'=−Voffset and BV_x'=BV_x can be used as the clipped BV. In yet another example, when BV_x+Hoffset is smaller than or equal to BV_y+Voffset, BV_x'=−Hoffset and BV_y'=BV_y. Otherwise, BV_y'=−Voffset and BV_x'=BV_x can be used as the clipped BV.

Case 2.

If BV_x is greater than 0 before clipping, then when BV_y>−Voffset is true, a clipping operation is required. For example, BV_y'=−Voffset and BV_x'=BV_x can be used as the clipped BV. In another example, BV_y'=−Voffset and BV_x'=0 can be used as the clipped BV.

Case 3.

If BV_y is greater than 0 before clipping, then when BV_x>−Hoffset is true, a clipping operation is required. For example, BV_x'=−Hoffset and BV_y'=BV_y can be used as the clipped BV. In another example, BV_x'=−Hoffset and BV_y'=0 can be used as the clipped BV.

Figure 4:
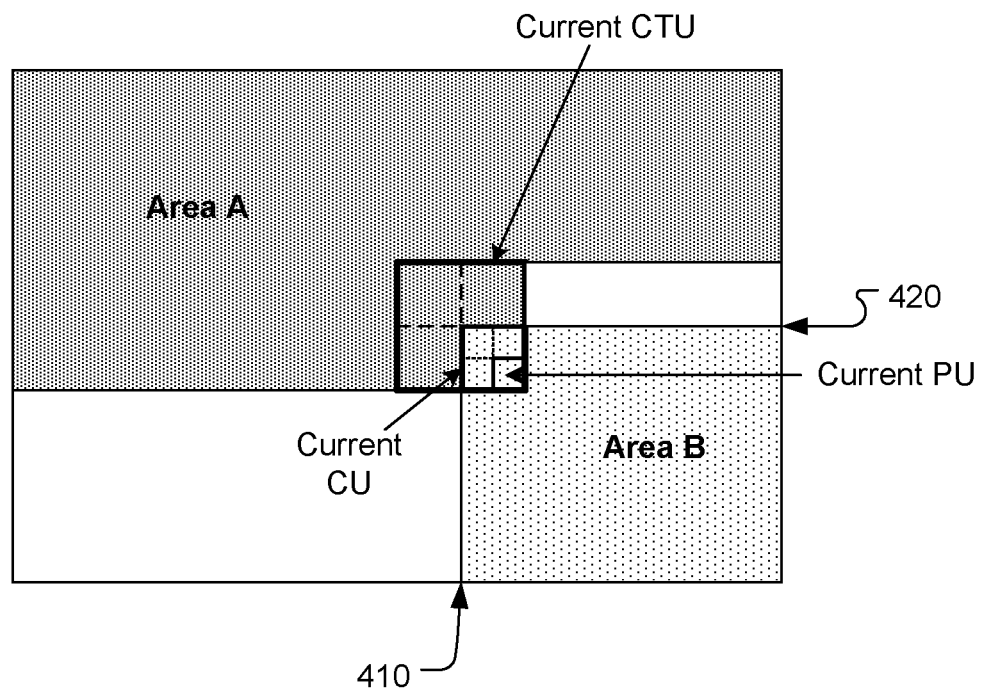
FIG. 4 illustrates an example of available reference area for encoding or decoding a current prediction unit within a coding unit (CU).
Figure 5:
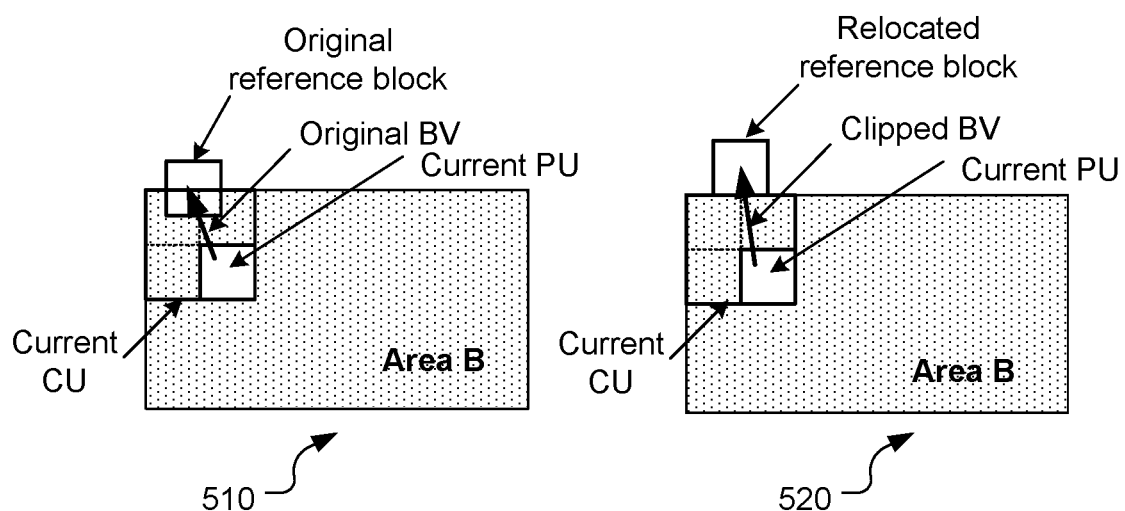
FIG. 5 illustrates an example of block vector clipping according to an embodiment of the present invention to avoid overlapping of the reference block and unavailable area B.

FIG. 4 illustrates an example of BV clipping according to an embodiment of the present invent. Area A shown as a pattern-filled area in FIG. 4 corresponds to the available area for IntraBC coding of a current CU. The area contains the already reconstructed samples within the current picture excluding the reconstructed area within the same CU. To avoid the invalid BV for IntraBC Merge mode, a method of BV clipping is disclosed in U.S. Provisional Patent Application, Ser. No. 62/045,620, filed on Sep. 4, 2014, where the BV is clipped if the area of IntraBC reference block is overlapped with area B. Area B is a rectangular area that the upper-left corner is the upper-left corner of the current CU, and the bottom-right corner is the bottom-right corner of the current picture. If the IntraBC reference block is overlapped with area B, a vertical or horizontal offset will be added to the BV to make the IntraBC reference block outside area B. FIG. 5 illustrates an example of BV clipping according to the process shown above. As shown in FIG. 5, the original IntraBC reference block before clipping is partially inside area B and partially outside area B as shown in case 510. After clipping, the relocated IntraBC reference block associated with the clipped BV is outside area B as shown in case 520. In FIG. 5, while the vertical component (i.e., y component) of the block vector is clipped, the horizontal component remains the same.

Figure 6:
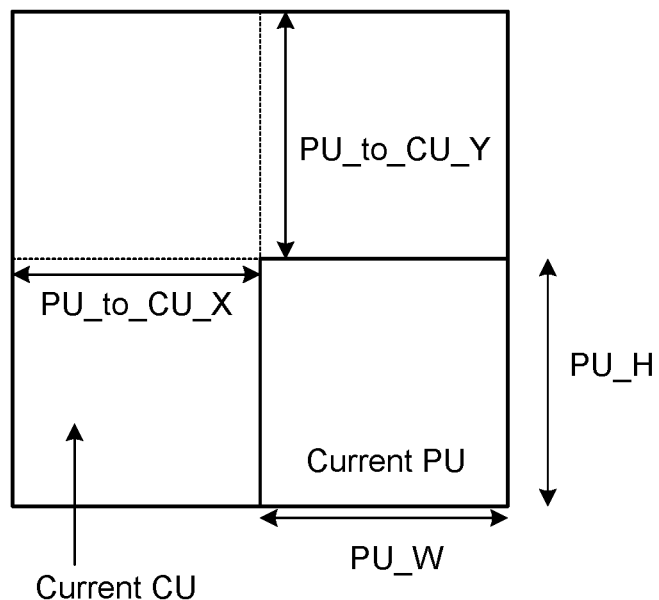
FIG. 6 illustrates the definition of terms associated with block vector clipping according to an embodiment of the present invention.

In the present invention, a simplified BV clipping process is disclosed as follows. For a BV of a PU, parameters, diff_x and diff_y are firstly derived according to the equation (1) and equation (2) respectively.

$$\text{diff\_}x = -PU\_to\_CU\_X - BV\_x - PU\_W \quad (1)$$

$$\text{diff\_}y = -PU\_to\_CU\_Y - BV\_y - PU\_H \quad (2)$$

where the location (PU_to_CU_X, PU_to_CU_Y) specifying the top-left sample of the current PU relative to the top-left sample of the current CU. PU_W and PU_H are the PU width and height respectively, as shown in FIG. 6. BV_x and BV_y are the horizontal and vertical vector of the BV. In the above description, the horizontal block vector, BV_x has a positive value if the vector points to the right direction and BV_x has a negative value if the vector points to the left direction. On the other hand, the vertical block vector, BV_y has a positive value if the vector points downward and BV_y has a negative value if the vector points upward. When diff_x is greater than or equal to 0, it implies that the reference block is located on the left side of the left boundary (410 in FIG. 4) of the current CU. When diff_y is greater than or equal to 0, it implies that the reference block is located above the top boundary (420 in FIG. 4) of the current CU.

The BV_x or BV_y can be refined according to an exemplary process shown in Table 2.

TABLE 2

```
if( diff_x< 0 &&diff_y< 0 )
{
    if( diff_x>= diff_y )
    {
        BV_x = − PU_to_CU_X − PU_W;
    }
    else
    {
        BV_y = − PU_to_CU_Y − PU_H;
    }
}
```

Another exemplary process to refine the BV_x or BV_y is shown in Table 3.

TABLE 3

```
if( diff_x< 0 &&diff_y< 0 )
{
    if( diff_x>diff_y )
    {
        BV_x = - PU_to_CU_X - PU_W;
    }
    else
    {
        BV_y = - PU_to_CU_Y - PU_H;
    }
}
```

In Table 2 and Table 3, the statement "diff_x<0 &&diff_y<0" implies that at least a portion of the reference block is not on the left side of boundary 410 and at least a portion of the reference block is not above the boundary 420 (i.e., at least one reference pixel in an area of the current reference block is unavailable). Accordingly, the statement implies that the reference block is overlapped with area B. The BV refinement process as shown in Table 2 and Table 3 can avoid the IntraBC reference block from overlapping with area B.

Figure 7:
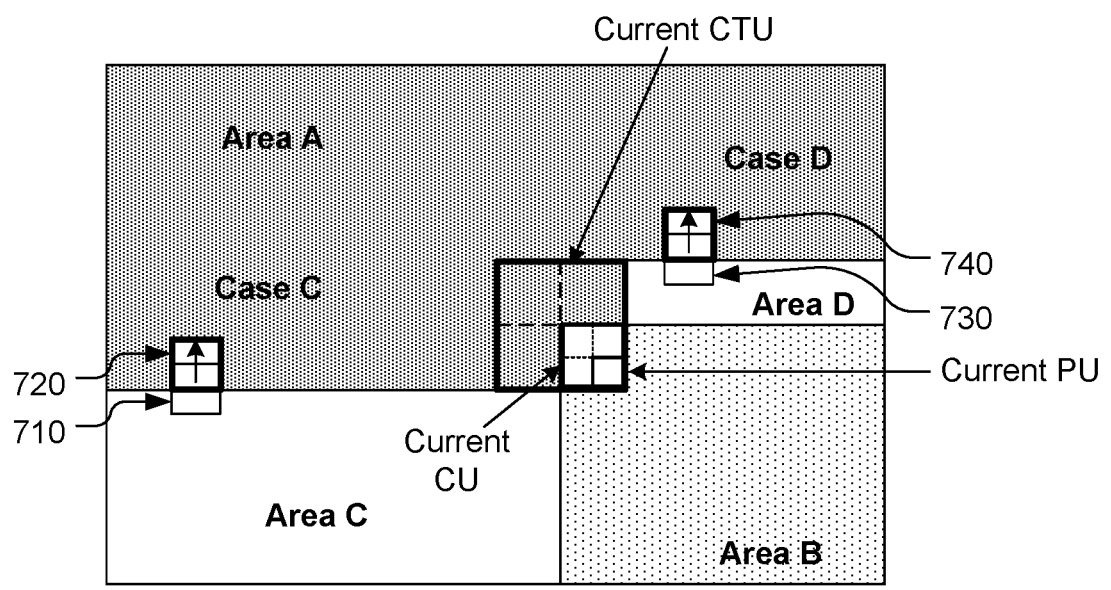
FIG. 7 illustrates an example of additional unavailable reference areas for encoding or decoding a current prediction unit within a coding unit (CU), which is in turn within a coding tree unit (CTU).

However, the area C and area D in FIG. 7 are also unavailable for IntraBC compensation. That is, a reference pixel belonging to the current reference block is regarded as unavailable if this reference pixel is located in area C or area D. Therefore, there is a need to further refine the BV clipping process. Accordingly, another two embodiments of BV clipping according to the present invention are disclosed to prevent the IntraBC reference block from overlapping with area C and area D.

The exemplary BV clipping in Table 4 can help to prevent the IntraBC reference block from overlapping with area C.

TABLE 4

```
if (PU_to_CTU_Y + BV_y + PU_H > CTU_H )
{
    BV_y = CTU_H - PU_to_CTU_Y - PU_H;
}
```

Figure 8:
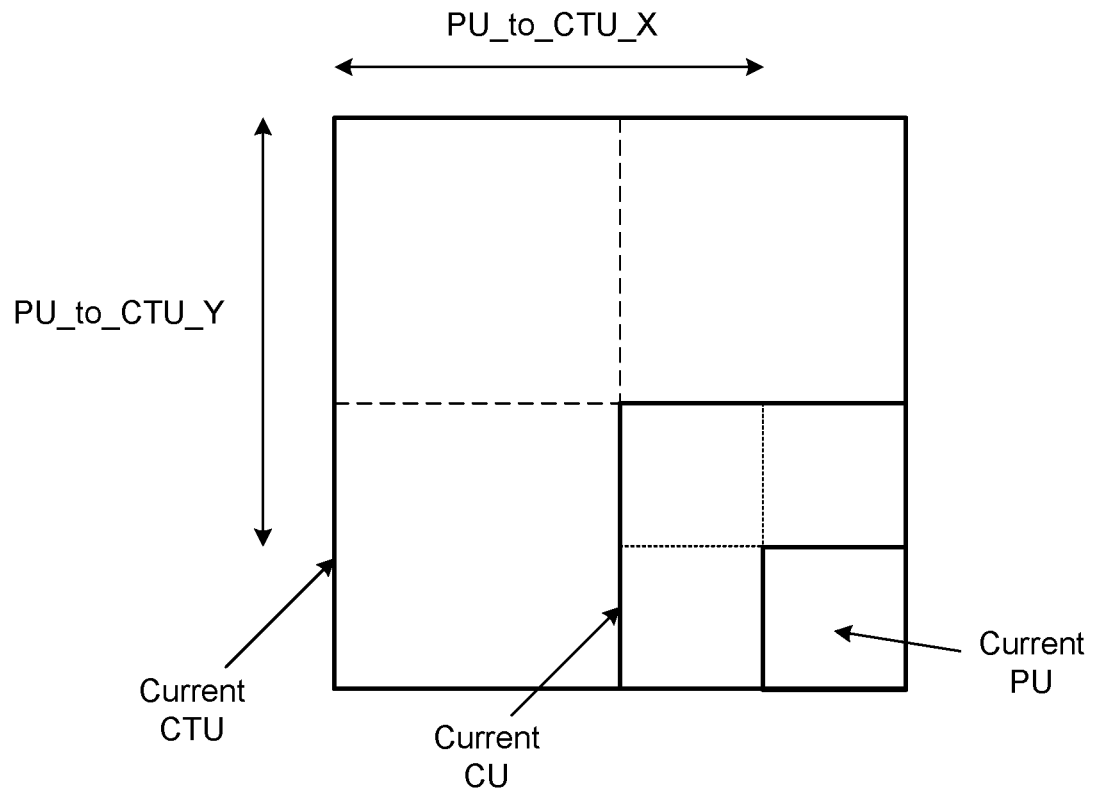
FIG. 8 illustrates the definition of terms associated with block vector clipping according to another embodiment of the present invention.

In Table 4, the vertical location PU_to_CTU_Y specifies the top-left sample of the current PU relative to the top-left sample of the current CTU, as shown in FIG. 8. CTU_H is the CTU height. The clipping process in Table 4 is capable of avoiding the IntraBC reference block overlapping with area C as shown in FIG. 7, where the IntraBC reference block (710) will be shifted to new location (720) due to the clipping process in Table 4.

The exemplary BV clipping in Table 5A and Table 5B can help to prevent the IntraBC reference block from overlapping with area D.

TABLE 5A

```
if (PU_to_CTU_Y + BV_y + PU_H > 0 &&PU_to_CTU_X
    + BV_x + PU_W > CTU_W)
{
    BV_y = - PU_to_CTU_Y - PU_H;
}
```

TABLE 5B

```
if (PU_to_CTU_Y + BV_y + PU_H > 0 &&PU_to_CTU_X
    + BV_x> CTU_W)
```

TABLE 5B-continued

```
{
    BV_y = - PU_to_CTU_Y - PU_H;
}
```

In Table 5A, the horizontal location PU_to_CTU_X specifying the top-left sample of the current PU relative to the top-left sample of the current CTU, as shown in FIG. 8. CTU_W is the CTU width. The clipping process in Table 5A and Table 5B is capable of avoiding the IntraBC reference block overlapping with area D as shown in FIG. 7, where the IntraBC reference block (730) will be shifted to a new location (740) due to the clipping process in Table 5A and Table 5B.

According to another embodiment, whenever a clipping operation is required, a predefined value can be used to clip the current block vector. In other words, the clipped BV can be a predefined value, i.e., BV'=BV_preset. Examples of predefined values, BV_preset can be (0, 0), (−W, 0), (−2W, 0), (0, −H), (0, −2H), (−W, −H), (−2W, −2H), (−Hoffset, 0), (0, −Voffset), (−Hoffset, −Voffset), where W and H refer to the respective width and height of the current block, or the respective width and height of the CU that contains the current block.

In one embodiment, for IntraBC Merge/Skip candidates, the order of BV_preset values to be used is: (−2W, 0), (0, −2H), (−W, 0), (0, −H), and (−2W, −2H). In other words, the BV present value, (−2W, 0) is not a previous candidate, the first candidate that needs clipping can be clipped to (−2W, 0). If (−2W,0) is already in the candidate list and if (0, −2H) is not a previous candidate, the first candidate that needs clipping can be clipped to (0, −2H) Otherwise, the predefined values are checked one by one until one different BV value is found. Similarly, if no previous candidate after clipping is (−W, 0); the second candidate that needs clipping will use (−W, 0) to clip, and so on. In this way, after clipping, Merge candidates with different BVs will be used. In another embodiment, the order for BV_preset values is (−2W, 0), (−W, 0), (0, −2H), (0, −H), (−W, −H).

When two IntraBC Merge/Skip candidates are the same after BV clipping, a predefined BV with a different value can be used to replace the duplicated candidate. Examples of predefined values are described above.

In the existing HEVC SCC practice, the smallest block size for IntraBC mode is 4×4. The previously coded BVs can be "compressed" by storing the BV in a larger block size, such as M×N with M×N larger than 4×4. Accordingly, all 4×4 blocks within each M×N pixel array will have only one BV value. For example, BVs can be stored in a 16×16 unit. When BV compression is used and the BV of a neighboring IntraBC coded block is used as the Merge/Skip candidate or as a BV predictor for the current block, the BV value of the neighboring block should also be the BV value representing the M×N unit (after BV compression).

IntraBC Compensation for Unavailable Area.

After applying BV clipping, there are still some BV candidates that point to unavailable area, i.e., where the reconstructed pixels are not available yet. The decoder behavior regarding how to compensate the IntraBC block is undefined when such BV candidate is selected or the coded BV points to an unavailable area. Several embodiments are disclosed to handle the issue of non-available area for IntraBC reference data.

Embodiment 1: Padding

If the IntraBC reference block is overlapped with the non-available area, the pixels in the non-available area are padded by using the neighboring available pixels. For example, each pixel row in the non-available area is padded by the last pixel row in the available area. Then the padded pixels are used for IntraBC compensation.

Embodiment 2: Setting to a Predefined Value

If the IntraBC reference block is overlapped with the non-available area, the pixels in the non-available area are set to a predefined value, such as 128 for 8-bit data or equal to the value of (1<<(bit_depth−1)). In another example, a data area designated to store the current reconstructed picture area is initialized to a predefined value (e.g. 128 or (1<<(bit_depth−1))) before encoding or decoding starts. After a block is coded and reconstructed, the reconstructed pixels are written into memory area for the reconstructed picture. If the IntraBC reference block is overlapped with the unavailable area, the predefined pixel values will be used since the predefined value in the non-available area has not been updated by the actual reconstructed value yet.

Embodiment 3: Setting to a Predefined Value for a Whole Block

If the IntraBC reference block is overlapped with the non-available area, the pixels of the whole reference block are set to a predefined value (e.g. 128 or (1<<(bit_depth−1))).

Temporal BV as BVP.

Figure 9:
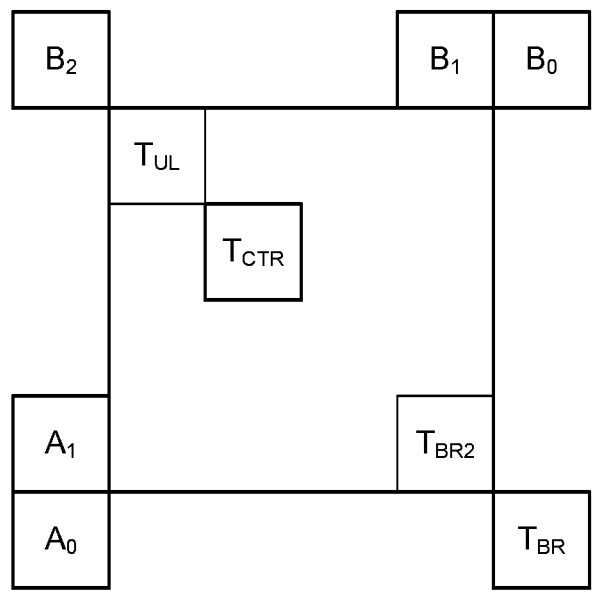
FIG. 9 illustrates an example of using block vectors of temporally collocated blocks for block vector prediction and Merge candidates according to an embodiment of the present invention.

In another embodiment of the present invention, the temporal collocated BV is placed into the BVP (BV prediction) list in IntraBC BVP/BVD (BV difference) coding or placed into the Merge candidate list. The BV of a block (e.g. $T_{BR}$, $T_{CTR}$, $T_{UL}$ or $T_{BR2}$) located in a collocated picture as shown in FIG. 9 can be used as one of the BV predictors. This embodiment can be restricted to be applied to the non-I-slice.

Default BV in Merge Candidate List.

IntraBC coding can be considered as Inter coding by inserting the reconstructed current picture into a reference frame list. Therefore, the IntraBC coding can be treated the same way as the Inter coding/compensation. However, the reference frame is point to reconstructed current picture instead of a collocated reference picture.

Since the IntraBC is treated as an Inter coding mode, the Merge candidate list may take into account this new Inter coding mode. According to one embodiment of the present invention, one or more predefined BVs can be added to the Merge candidate list as default Merge candidates if the Merge candidate list is not full. Since the IntraBC coding mode is now treated as an Inter mode, the BVs are considered as MVs with the reference frame (i.e., refIdx) pointing to reconstructed current picture. In the following description, the statement "BV=(x,y)" means "MV=(x,y) with ref_List (i.e., reference list) and refIdx (i.e., reference picture index) pointing to the current reconstructed picture".

A pruning process is often applied during Merge candidate construction, where duplicated candidate values will be removed. When there are not enough candidates to fill the list, default motion vector, (0, 0) is added to the Merge candidate list. However, the (0, 0) default vector is not proper for IntraBC. Accordingly, an embodiment of the present invention uses one or more non-zero vector to fill the Merge candidate list. When the Merge candidate list index (i.e., merge_idx) points to one of these additional candidates, the current block will be coded in IntraBC mode using the corresponding BV indicated by merge_idx (i.e., merge index).

Exemplary non-zero vectors that can be used to add to the Merge candidate list as additional Merge candidates include (−W, 0), (−2W, 0), (0, −H), (0, −2H) and (−W, −H). The value W and H may refer to the width and height of the current prediction unit, or the width or height of the current coding unit (CU). The examples of predefined non-zero vectors are for illustration purpose and they should not be construed as limitations of the present invention. Other predefined non-zero vectors, such as (−2W, 0), (−W, 0), (0, −2H), (0, −H) and (−W, −H) may also be used as additional IntraBC Merge candidates to fill up the candidate list.

In another embodiment, the last coded N BVs can also be used to fill the candidate list, where N is an integer greater than 0. Furthermore, the last coded N BVs and the predefined values can also be used at the same time to fill the candidate list. For each candidate list, the candidates are located in the list according to an order and each candidate can be identified by an index (e.g. merge_idx). For example, an ordered Merge candidate can be {last coded BV, second last coded BV, (−W, 0), (−2W, 0), (0, −H)} or {last coded BV, second last coded BV, (−2W, 0), (−W, 0), (0, −2H)}. In these two examples, the maximum number of Merge candidates is assumed to be 5. Other candidate ordering may also be used. For example, the last coded BVs can be placed after the predefined BVs.

A newly added Merge candidate corresponding to one last coded BV may already be in the Merge candidate list. For example, this last coded BV may happen to be the same as the BV of a neighboring block of the current block. The pruning processes can be applied to check whether the last coded BVs are redundant. If so, the redundant candidates are removed. The pruning process applied during adding the last coded N BVs can also be applied during adding the predefined non-zero BVs mentioned above.

Part or all the additional BV candidates to fill the Merge candidate list mentioned above can be inserted before the combined bi-predictive Merge candidate. For example, the BVs of (−2W,0) and (−W,0) can be inserted before the combined bi-predictive Merge. In another example, part or all of the additional BV candidates to fill the Merge candidate list mentioned above can be inserted after the type-1 additional candidates and before the type-2 additional candidates. For example, the BVs of (−2W,0) and (−W,0) can be inserted before the type-2 additional candidates. The type-1 candidate corresponds to the combined bi-predictive Merge candidate and the type-2 candidate corresponds to the scaled bi-predictive Merge candidate according to HEVC. In yet another example, part or all of the additional BV candidates to fill the Merge candidate list mentioned above can be inserted after part of the type-2 additional candidates. For example, the BVs corresponding to (−2W,0) and (−W,0) can be inserted after the first type-2 additional candidates. In yet another example, part or all of the additional BV candidates to fill the Merge candidate list mentioned above can be inserted after the type-2 additional candidates and before the zero motion vector with refIdx equal to 0. For example, the BVs of (−2W,0) and (−W,0) can be inserted after the type-2 additional candidates. In yet another example, part or all of the additional BV candidates to fill the Merge candidate list mentioned above can be used to replace the type-2 additional candidates.

In another embodiment to prevent redundant filling of MV or BV, if the type-2 and type-3 additional candidates point to a reconstructed current picture, they can be removed because the default BV can be used to replace them. The type-3 candidate corresponds to zero vector Merge/AMVP (advanced motion vector prediction) candidate as disclosed in HEVC.

The embodiments of Merge candidate list filling using the last coded N BVs or non-zero BVs can be applied to I-slice only. In I-slice, the type-1 and/or type-2 additional candidates can be removed. In type-1 additional candidate derivation, the IntraBC coded BV can be excluded from generating the combined Merge candidates. For example, if the Merge candidate with index 0 is IntraBC coded BV, it will not be used to generate combined Merge candidates.

The temporal candidate in collocated picture can be used in Merge mode and AMVP mode for Inter coded block. In the Merge candidate and AMVP MV predictor derivation, the IntraBC coded block is treated as unavailable. In one embodiment of the present invention, the BV of IntraBC coded block in collocate picture is included as one of the Merge candidate or BV predictor. For example, if the temporal Inter candidates are unavailable, the available temporal IntraBC candidates are included. The position of the temporal IntraBC candidate in collocated picture can be the same as the position of the temporal Inter candidate in collocated picture.

Some BVs in the Merge candidate list may not be valid BVs and such BVs can be removed during the Merge candidate derivation. For example, the BVs equal to (0,0) or pointing to an area outside the current picture, an area not yet decoded, or a decoded area within the same coding unit are not valid. Such BVs can be removed from the Merge candidate list.

The present invention also deals with the availability and constraint aspects of spatial neighboring Merge candidates. When a spatial neighboring Merge candidate is coded in IntraBC mode, the candidate block is treated as available without any constraint. In another example, the candidate block from the above current block is constrained to the candidate block within the current CTU (coding tree unit). Otherwise, if the candidate block is from the CTU above the current CTU, the candidate block is treated as unavailable. In yet another example, the candidate block from above current block is constrained if the candidate block is in the CTU above the current one. The constraint may also correspond to the BV that is compressed to conserve storage space. For example, the smallest block to have different BV values is no longer 4×4. Instead, the BVs are shared by a larger unit, such as in a 16×16 unit. Therefore, the above CTU row will only store BV values in the 16×16 unit.

In one embodiment, the above mentioned constraints can be selectively applied depending on the slice type. For example, for blocks in an Intra slice, the spatial candidates for Skip, Merge, and/or IntraBC mode are treated as unavailable if the candidate block is from the CTU above the current one. On the other hand, for blocks in an Inter slice, the spatial candidate for Skip, Merge, and/or IntraBC mode does not have such constraints. In another example, the coded BVs for the Intra slice are stored in a compressed format, where one BV is stored for each M×N (e.g. 16×16) unit. When a spatial candidate is located in the CTU above the current one and overlaps with a stored BV's location, the stored BV can be used for this candidate as Merge candidate. On the other hand, the coded BVs in an Inter slice may or may not use the BV compression.

Condition Dependent Context Modeling for BVD Coding.

In HEVC, each of binarized MVD (motion vector difference) component is coded using 2-bit TU (truncated unary code) plus EG-1 (Exponent-Golomb) code. The first two bins are coded with contexts and rest bins are bypass coded. In HEVC, since there is neither 8×4/4×8 bi-predictions nor 4×4 Inter block, the maximum number of MVDs for coding an 8×8 block is two. For each MVD, it has horizontal and vertical components. For each of the component, two context coded bins are required. Therefore, the maximum context coded bins for MVD coding of an 8×8 Inter coded block is 8 bins.

In JCTVC-R1014 (i.e., HEVC SCM2), the 4×4 PU is supported in IntraBC coding. The BVD coding use 1 context coded bin for each of BVD horizontal and vertical components. The maximum context coded bins for BVD coding of an IntraBC coded 8×8 block are 8 bins. However, using more contexts for BVD coding may not achieve further coding gains. On the other hand, it may cause to exceed the number of context coded bins of HEVC and SCM2 in MVD/BVD coding. Accordingly, condition-dependent context modeling for BVD coding is disclosed to ensure the context modeling for BVD coding not to exceed the number of context coded bins of HEVC and SCM-2.0 for MVD/BVD coding. The context modeling of BVD can depend on the block size, prediction mode, partition mode or size, inter_dir (i.e., Inter prediction direction), refIdx (i.e., reference picture index), etc. For example, if the PU partition is N×N and the PU size is 4×4, then only the first bin is coded with context and the rest bins are bypass coded. Otherwise, the first two bins are coded with context and the rest bins are bypass coded.

In the palette coding, the redundant index, $I_{run\_red}$ of current pixel can be determined from the last coded prediction mode. For the prediction mode other than the last coded prediction mode, if the first index predictor is the same as the redundant index, $I_{run\_red}$, the first index predictor can be replaced by a replacement index that is a fixed index or derived index. The replacement index can be 0 or the smallest possible and non-redundant index that is not equal to $I_{run\_red}$. For example, if $L_{run\_red}$ is 0, the replacement index can be set to 1. Otherwise, the replacement index can be set to 0. The index replacement method can be disabled if the $I_{run\_red}$ is equal to the escape index.

Figures 10A, 10B, 11A, 11B:
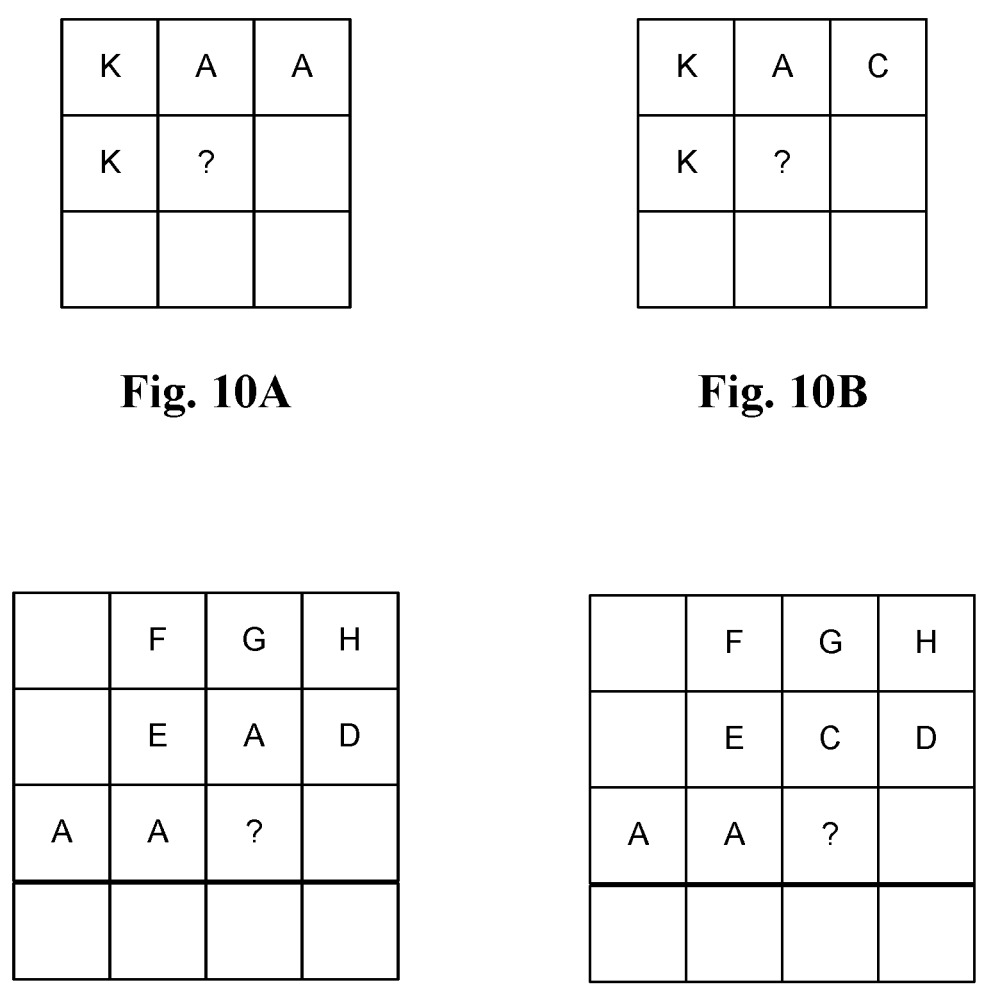

In SCM2.0, if the previous prediction mode is copy-above mode, the current index cannot be the same as the above index. Otherwise, the current index coding would be merged into the previous run of copy-above mode. FIG. 10A illustrates an example of redundant index determination and the color index coding process to take advantage of redundant index. The location indicated by a question mark "?" corresponds to the current pixel to be encoded or decoded. The pixel to the left of the current pixel has an index "K" and is coded using the copy-above mode. The current index cannot be "A" and otherwise, it would have been coded along with the left pixel as the copy-above mode. In this case, an embodiment of the present invention refines the prediction source if other prediction mode is used. For example, if the prediction mode is copy-above-right, the index of the above-right pixel cannot be "A". It can be replaced by a replacement index that is fixed index or derived index such as "C" in FIG. 10B. "C" can be 0 or the smallest possible and non-redundant index that is not equal to $I_{run\_red}$. For example, if $I_{run\_red}$ is 0, "C" can be set to 1. Otherwise, "C" can be set to 0.

In another example, the current index cannot be the same as the left indexif the previous prediction mode is run_mode (e.g. copy left run). Otherwise, the current index coding can be merged into the previous run of run_mode. The redundant index value is designated as $I_{run\_red}$ (e.g. "A") in FIG. 10A.

However, if the above index of current to-be-encode index is equal to $I_{run\_red}$, the copy above prediction of current index is redundant. Therefore, in this case, an embodiment of the present invention replaces the index predictor of the above index if copy above mode is used.

If the above index of current to-be-encode index is equal to $I_{run\_red}$ (e.g. "A") in FIG. 11A, the decoder can replace the index predictor of the above index of copy-above mode by a replacement index that is fixed index or derived index (e.g. "C") in FIG. 11B. "C" can be 0 or the smallest possible and non-redundant index that is not equal to $I_{run\_red}$. For example, if $I_{run\_red}$ is 0, the "C" can be set to 1. Otherwise, "C" can be set to 0.

The embodiment mentioned above can be applied to different prediction modes. For example, the redundant index, $I_{run\_red}$ can be the redundant index of any prediction mode, such as the index of the above N-row for copy-above-N-row. If the last coded mode is run_mode and the previous coded index is the same as $I_{run\_red}$, the $I_{run\_red}$ of the prediction mode (e.g. the index of the above N row for copy-above-N-row) can be replaced by the derived index.

For the replacement index, it can be a index, a smallest possible and non-redundant index that is not equal to $I_{run\_red}$, or an index derived from neighboring index of current pixel or neighboring index of $I_{run\_red}$. For example, it can be the left index of $I_{run\_red}$ (i.e., "E" in FIG. 11A), above index of $I_{run\_red}$ (i.e., "G" in FIG. 11A), or right index of $I_{run\_red}$ (i.e., "D" in FIG. 11A).

In JCTVC-S0078 (Sun et al., *CE6 Test C.2: Transition copy mode*, Joint Collaborative Team on Video Coding (JCT-VC) of ITU-T SG 16 WP 3 and ISO/IEC JTC 1/SC 29/WG11, 19th Meeting: Strasbourg, FR, 17-24 Oct. 2014, Document: JCTVC-S0078), a new coding mode named Transition Copy (TC) Run is disclosed by some joint inventors of the present application. In the TC run mode, a decoder records the adjacent color index patterns and uses it to predict to-be-coded indices.

The palette index coding with redundant index can be applied to the Transition Copy mode. In the TC refinement case of JCTVC-S0078, the decoder can refine TC predictor to a prefixed index or to a derived index.

An example of refining TC predictor to a derived index may correspond to refining the TC predictor to a special neighboring index or a temporal neighboring index that is different from the replacement index. For example, the special neighboring index can be the above-left index, above-right index, or the index in the previous row.

If the decoder already refined the above-left index, above-right index, or the index in the previous row, the TC predictor can be refined to another index.

Run Short-Cut in Palette Coding.

In palette run coding, an embodiment of the present invention adds a short-cut for the case that the run number equals to the number of samples through the end of the current row/column or through the end of the block. The short-cut can be indicated by a flag inserted before the N-th bin of the binarized run. The N can be a defined value (e.g. 2, 3, 4, or 5). If the flag is 1, the run is set as the run number equal to the number of samples through the end of the current row/column or through the end of the block. If the flag is 0, the decoding of following bins should be processed. The N can depend on the block size, the number of samples to be coded, the maximum possible run number, the current palette prediction mode, the coded palette prediction mode, or the coded run. The maximum possible run number for binarization can be reduced by 1 because the short-cut already represents the maximum run number.

The short-cut can be set to a number, M. In the encoder side, if the run to be encoded is larger than M, it should be increased by 1 for binarization. In the decoder side, if the decoded run is larger than M, the actual run should be equal to the decoded run minus 1. If the decoded run is equal to M, the run is set as the run number equal to the number of samples through the end of the current row/column or through the end of the block. The M can be a pre-defined value (e.g. 2, 3, 4, or 5). The M can depend on the block size, the number of samples to be coded, the maximum possible run number, the current palette prediction mode, the coded palette prediction mode, or the coded run. The maximum possible run number for binarization can be reduced by 1 because the short-cut already represent the maximum run number.

Remove Redundant Index Considering TC Index.

For run mode in SCM 2.0, the encoder will remove a redundant index value before signaling the index value. If the previous run is copy-above mode, the above index of the current run is the redundant index value that is to be removed. If previous run is run mode, the previous index of current run is the redundant index value that is to be removed. In the index reconstruction stage, the decoder should reconstruct index from the parsing index and the removing redundant index value. If the parsed index value is larger than or equal to the removed redundant index value, the reconstructed index value is the parsed index value plus 1. Otherwise, the reconstructed index value is the parsed index value.

The derivation and removal of redundant index value can also be applied to the TC mode. If the previous run is TC mode, the previous index of current run is the redundant index value that is to be removed. Then, the redundant index removal in SCM2.0 is applied to TC mode with this new redundant index value for removal.

Remove Redundant Index Considering TC Index.

In SCM2.0, different context set will be selected to encode run length according to the current run mode. If current run is INDEX run, the first context set will be selected. If current run is copy-above run, the second context set will be selected.

Another embodiment uses the third context set for run coding of TC mode. If the current run is TC run, the third context set will be selected. For simplification, the run coding context set of TC mode can share the context set of run mode or copy above mode.

Figure 12:
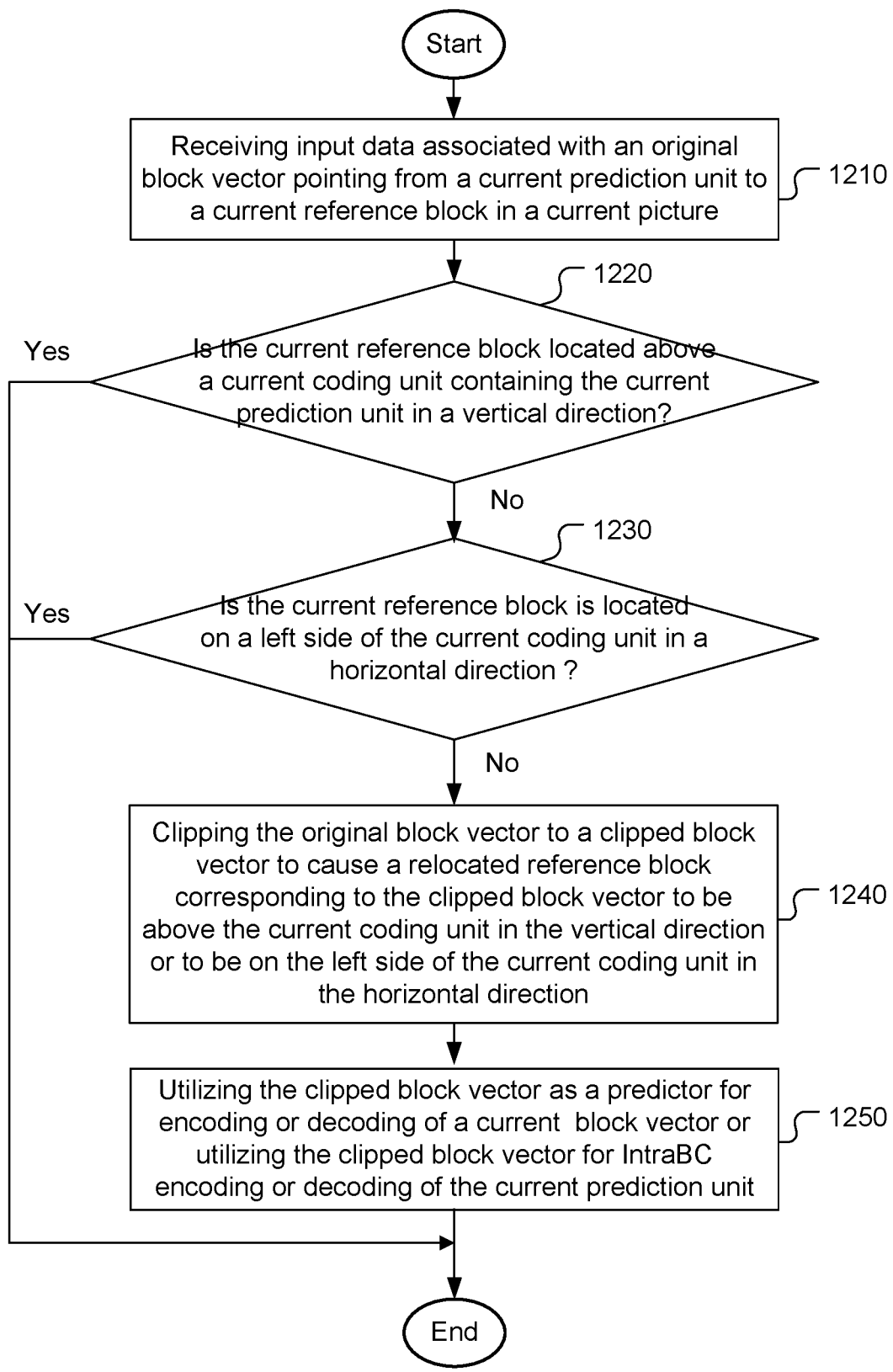
FIG. 12 illustrates an exemplary flowchart for a coding system using clipped block vector incorporating an embodiment of the present invention.

FIG. 12 illustrates a flowchart of an exemplary coding system including IntraBC mode (Intra-block copy mode) according to an embodiment of the present invention. The system receives input data associated with an original block vector pointing from a current prediction unit to a current reference block in a current picture as shown in step 1210. For encoding, the input data corresponds to original block vector to be encoded. For decoding, the input data corresponds to coded block vector to be decoded. The input data may be retrieved from memory (e.g., computer memory, buffer (RAM or DRAM) or other media) or from a processor. Whether the current reference block is located above a current coding unit containing the current prediction unit in a vertical direction is determined in step 1220. Whether the current reference block is located on a left side of the current coding unit in a horizontal direction is determined in step 1230. If both results of the above decisions are "No", steps 1240 and 1250 are performed. Otherwise (i.e., any "Yes" path in step 1220 and step 1230), steps 1240 and 1250 are not performed. In step 1240, the original block vector is clipped to a clipped block vector to cause a relocated reference block corresponding to the clipped block vector to be above the current coding unit in the vertical direction or to be on the left side of the current coding unit in the horizontal direction. In step 1250, the clipped block vector is used as a predictor for encoding or decoding of a current block vector or utilizing the clipped block vector as a Merge candidate or a Skip candidate for encoding or decoding of the current prediction unit.

The flowchart shown above is intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using coding modes including IntraBC mode (Intra-block copy mode) for a current picture, the method comprising:
   determining, by a processor of an apparatus, a coded block vector that is included in a bitstream for carrying data of the current picture, the coded block vector pointing from a current prediction unit in the current picture to a reference block in the current picture;
   determining whether the reference block is located at least partially inside a current coding unit containing the current prediction unit;
   in response to the reference block being determined to be located at least partially inside the current coding unit,
      determining, by the processor of the apparatus, a modified block vector by modifying the coded block vector, the modified block vector pointing from the current prediction block to a modified reference block that corresponds to vertically shifting or horizontally shifting the reference block to be outside the current coding unit, all samples of the modified reference block being available for coding the current prediction unit;
   performing at least one of:
      (i) in a case that the reference block is located on a left side of the current coding unit in a horizontal direction,
         determining whether the reference block is at least partially below a lower edge of a coding tree unit containing the current coding unit in a vertical direction, and
         in response to the reference block being determined to be located on the left side of the current coding unit and at least partially below the lower edge of the coding tree unit, determining the modified block vector by modifying the coded block vector such that the modified reference block is above the lower edge of the coding tree unit; and
      (ii) in a case that the reference block is located on a right side of the current coding unit in the horizontal direction,
         determining whether the reference block is at least partially below a upper edge of the coding tree unit containing the current coding unit in the vertical direction, and
         in response to the reference block being determined to be located on the right side of the current coding unit and at least partially below the upper edge of the coding tree unit, determining the modified block vector by modifying the coded block vector such that the modified reference block is above the upper edge of the coding tree unit; and
   in a case that the modified block vector is determined,
      utilizing, by the processor of the apparatus, the modified block vector as a predictor for encoding or decoding of a current block vector for the current prediction unit, or utilizing, by the processor of the apparatus, the modified block vector as the current block vector for the current prediction unit for IntraBC encoding or decoding of the current prediction unit.

2. The method of claim 1, wherein the determining whether the reference block is located at least partially inside the current coding unit is performed based on parameters comprising the coded block vector, a block size of the current prediction unit, and a horizontal distance and a vertical distance between a top-left sample of the current prediction unit and a top-left sample of the current coding unit.

3. The method of claim 2, wherein the determining whether the reference block is located at least partially inside the current coding unit comprises:
   determining a first sum corresponding to a negative sum of a vertical component of the coded block vector, a block height of the current prediction unit, and the vertical distance between the top-left sample of the current prediction unit and the top-left sample of the current coding unit, wherein the vertical component of the coded block vector has a positive value for the coded block vector pointing downward; and
   determining that the coded reference block is located above the current coding unit in the vertical direction when the first sum is equal to or greater than zero.

4. The method of claim 3, wherein the determining whether the reference block is located at least partially inside the current coding unit further comprises:
   determining a second sum corresponding to a negative sum of a horizontal component of the coded block vector, a block width of the current prediction unit, and the horizontal distance between the top-left sample of the current prediction unit and the top-left sample of the current coding unit, wherein the horizontal component of the coded block vector has a positive value for the original block vector pointing to a right direction; and
   determining that the reference block is located on the left side of the current coding unit in the horizontal direction when the second sum is greater than or equal to zero.

5. The method of claim 4, wherein, in response to the reference block being determined to be located at least partially inside the current coding unit, the determining the modified block vector by modifying the coded block vector comprises:
   in a case that the second sum is greater than or equal to the first sum, set a horizontal component of the modified block vector to a negative sum of the block width of the current prediction unit and the horizontal distance between the top-left sample of the current prediction unit and the top-left sample of the current coding unit.

6. The method of claim 5, wherein, in response to the reference block being determined to be located at least partially inside the current coding unit, the determining the modified block vector by modifying the coded block vector comprises:
   in a case that the second sum is smaller than the first sum, set a vertical component of the modified block vector to a negative sum of the block height of the current prediction unit and the vertical distance between the top-left sample of the current prediction unit and the top-left sample of the current coding unit.

7. The method of claim 4, wherein, in response to the reference block being determined to be located at least partially inside the current coding unit, the determining the modified block vector by modifying the coded block vector comprises:
   in a case that the second sum is greater than the first sum, set a horizontal component of the modified block vector to a negative sum of the block width of the current prediction unit and the horizontal distance between the top-left sample of the current prediction unit and the top-left sample of the current coding unit.

8. The method of claim 7, wherein, in response to the reference block being determined to be located at least partially inside the current coding unit, the determining the modified block vector by modifying the coded block vector comprises:
   in a case that the second sum is smaller than or equal to the first sum, set a vertical component of the modified block vector to a negative sum of the block height of the current prediction unit and the vertical distance between the top-left sample of the current prediction unit and the top-left sample of the current coding unit.

9. The method of claim 1, further comprising:
   in a case that the reference block is determined to be located on the left side of the current coding unit and at least partially below the lower edge of the coding tree unit,
      setting a vertical component of the modified block vector to a value that is a block height of the coding tree unit subtracts a block height of the current prediction unit and subtracts a vertical distance between a top-left sample of the current prediction unit and a top-left sample of the coding tree unit.

10. The method of claim 1, further comprising:
    in a case that the reference block is determined to be located on the right side of the current coding unit and at least partially below the lower edge of the coding tree unit,
       setting a vertical component of the modified block vector to a negative sum of a block height of the current prediction unit and a vertical distance between a top-left sample of the current prediction unit and a top-left sample of the coding tree unit.

11. The method of claim 1, wherein, in response to the reference block being determined to be located at least partially inside the current coding unit,
    the modified block vector is set to a pre-defined vector,
    the pre-defined vector is selected from a group comprising (−W, 0), (−2W, 0), (0, −H), (0, −2H), (−W, −H), and (−2W, −2H), and
    W and H respectively correspond to a width and a height of the current prediction unit, or to a width and a height of the current coding unit containing the current prediction unit.

12. A method of video coding using coding modes including IntraBC mode (Intra-block copy mode) for a current picture, the method comprising:
    determining, by a processor of an apparatus, a block vector for a current prediction unit in the current picture;
    locating a reference block in the current picture according to a location of the current prediction unit and the block vector;
    determining whether the reference block overlaps a non-available area, all samples in the non-available area being unavailable for coding the current prediction unit;
    in response to determining that the reference block overlaps the non-available area, applying IntraBC encoding or decoding to the current prediction unit by setting all reference samples corresponding to the whole reference block to a predetermined value; and
    in response to determining that the reference block does not overlap the non-available area, applying IntraBC encoding or decoding to the current prediction unit using reconstructed samples of the reference block.

13. A method of video coding using coding modes including IntraBC mode (Intra-block copy mode) for a current picture, the method comprising:
  determining, by a processor of an apparatus, a coded block vector that is included in a bitstream for carrying data of the current picture, the coded block vector pointing from a current prediction unit in the current picture to a reference block in the current picture;
  determining whether the reference block is located in an area that all samples of the reference block are available for coding the current prediction unit; and
  in response to the reference block being determined not to be located in the area,
    determining, by the processor of the apparatus, a modified block vector by modifying the coded block vector, the modified block vector pointing from the current prediction block to a modified reference block that corresponds to vertically shifting or horizontally shifting the reference block to be outside the current coding unit and to be inside the area that all samples of the modified reference block are available for coding the current prediction unit, and
    utilizing, by the processor of the apparatus, the modified block vector as a predictor for encoding or decoding of a current block vector for the current prediction unit, or utilizing, by the processor of the apparatus, the modified block vector as the current block vector for the current prediction unit for IntraBC encoding or decoding of the current prediction unit.

14. The method of claim 12, wherein the predetermined value is determined according to $(1<<(bit\_depth-1))$, bit_depth being a bit depth of values of the reconstructed samples of the reference block.

* * * * *